(No Model.)　　　　　　W. G. TAYLOR.　　　　2 Sheets—Sheet 1.
BUTTER OR ADJUSTER FOR HARVESTERS.
No. 306,549.　　　　　　　　　Patented Oct. 14, 1884.
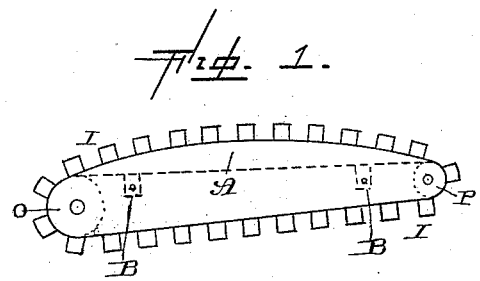
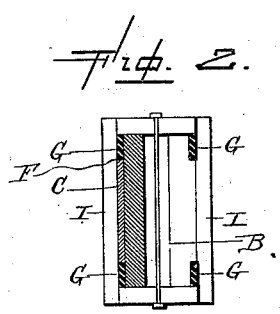
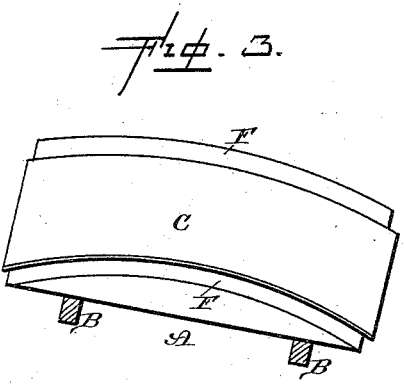
Witnesses.
Louis F. Gardner
J. W. Garner
Inventor.
W. G. Taylor,
per
J. A. Lehmann,
Atty.

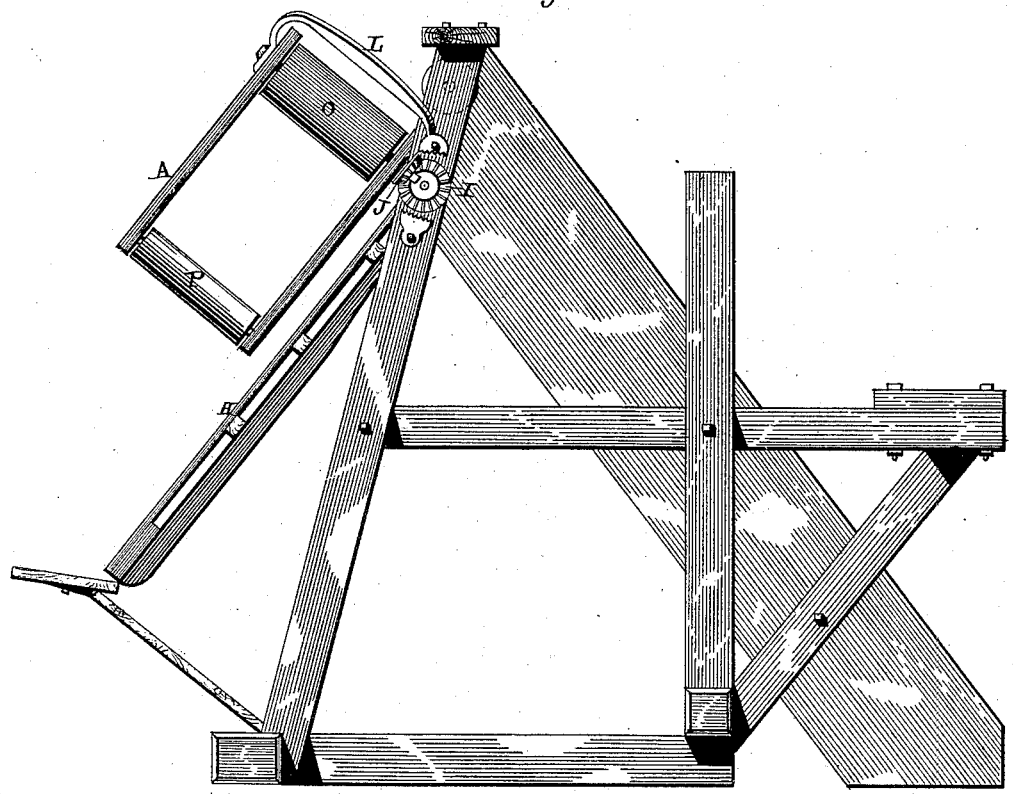

United States Patent Office.

WILLIAM GILMORE TAYLOR, OF XENIA, OHIO.

BUTTER OR ADJUSTER FOR HARVESTERS.

SPECIFICATION forming part of Letters Patent No. 306,549, dated October 14, 1884.

Application filed September 19, 1883. (No model.)

*To all whom it may concern:*

Be it known that I, WILLIAM G. TAYLOR, of Xenia, in the county of Greene and State of Ohio, have invented certain new and useful Improvements in Butters or Adjusters for Harvesters; and I do hereby declare the following to be a full, clear, and exact description of the invention, such as will enable others skilled in the art to which it pertains to make and use it, reference being had to the accompanying drawings, which form part of this specification.

My invention relates to an improvement in butters or adjusters for harvesters; and it consists in an adjuster or butter having a convex surface, and having shoulders or recesses cut upon opposite edges, so as to receive the straps of the endless apron or carrier, the cross-pieces of the apron or carrier being in direct contact with the convex surface, all of which will be more fully described hereinafter.

The object of my invention is to so form the adjuster or butter that the grain will be adjusted at or about the center of the butter, and so that the slatted belt will leave the butts of the grain before making the turn at the lower end of the adjuster, and thus prevent catching straws and choking and clogging the belt.

Figure 1 is a plan view of my invention complete. Fig. 2 is a transverse section. Fig. 3 is a perspective view of the butter-frame by itself. Fig. 4 is a side elevation of the framework of a binding-machine or harvester, showing the position of the adjuster standing on its edge, the belt being removed so as to show the pulleys.

H represents a binder-platform on which the binding is done, and to which platform the adjuster stands at right angles, as shown, being secured pivotally in position by means of a suitable metallic frame, L. The upper roller, O, in the adjuster is driven by the gear-wheel J, which meshes with the gear-wheel I.

No further description is here given of the machine or its frame-work, because it forms no part of this invention.

A represents the butter or adjuster, which is to be placed on the frame of the ordinary adjuster or butter, as shown in dotted lines in Fig. 1.

This butter consists of a frame, which is convex upon its side or face, and which is provided with suitable cross-bars, B, which extend across inside of the ordinary butter-frame, and are fastened thereto by means of rods, bolts, or screws, as shown in Fig. 2.

The face of this adjuster or butter is formed of a thin board, C, which is just about the thickness of the belts used in connection with the carrier, and which board C is just wide enough to leave a shoulder or offset, F, at each of its sides, to receive the belts G, to which the slats I are secured. These belts G, moving in recesses F, are kept always in position, and the cross pieces or slats I are held in direct contact with the surface of the board C, so as to prevent straws and dirt from getting under them and clogging their action.

Where the butter has a straight surface, or where the belts are not made to work in recesses, as here shown, the vibration of the belts, while in motion, allows straws to get under them, and thus clog them up.

As the face of this adjuster or butter is made convex next to the butts of the grain, the slats leave the grain before it makes the turn on the lower end of the frame, leaving the butts perfectly straight in the compressor-arm, which holds it while the needle is at work.

Having thus described my invention, I claim—

In a butter or adjuster for harvesters, the frame A, provided with a board or covering, C, upon its face, and having the shoulders or offsets F, to receive the belts, with the belts and the cross pieces or slats, substantially as shown and described.

In testimony whereof I affix my signature in presence of two witnesses.

WILLIAM GILMORE TAYLOR.

Witnesses:
JOHN McCONNELL,
ELDORAS G. TAYLOR.